US009062662B1

(12) United States Patent
Johnson et al.

(10) Patent No.: US 9,062,662 B1
(45) Date of Patent: Jun. 23, 2015

(54) HYBRID POLE STRUCTURE AND METHOD OF ASSEMBLY

(71) Applicant: Ebert Composites Corporation, Chula Vista, CA (US)

(72) Inventors: David W. Johnson, San Diego, CA (US); H. Peter Fay, Solana Beach, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 0 days.

(21) Appl. No.: 14/226,471

(22) Filed: Mar. 26, 2014

Related U.S. Application Data

(60) Provisional application No. 61/805,658, filed on Mar. 27, 2013.

(51) Int. Cl.
*E04H 12/34* (2006.01)
*F03D 11/04* (2006.01)
*B65D 90/12* (2006.01)

(52) U.S. Cl.
CPC .............. *F03D 11/045* (2013.01); *B65D 90/12* (2013.01); *E04H 12/342* (2013.01); *Y02E 10/728* (2013.01)

(58) Field of Classification Search
CPC ..... Y02E 10/728; F03D 11/04; F03D 11/045; E04H 12/12; E04H 12/342; E04H 7/28
USPC .......... 52/223.3–223.5, 835, 40, 745.04, 260, 52/382, 379
See application file for complete search history.

(56) References Cited

U.S. PATENT DOCUMENTS

| | | | | |
|---|---|---|---|---|
| 4,166,347 A | * | 9/1979 | Pohlman et al. | 52/223.4 |
| 4,242,851 A | * | 1/1981 | Pohlman et al. | 52/848 |
| 4,312,162 A | * | 1/1982 | Medney | 52/309.16 |
| 4,689,930 A | * | 9/1987 | Menchetti | 52/277 |
| 6,286,281 B1 | * | 9/2001 | Johnson | 52/592.1 |
| 6,409,433 B1 | * | 6/2002 | Hubbell et al. | 405/250 |
| 7,159,370 B2 | * | 1/2007 | Oliphant et al. | 52/845 |
| 7,160,085 B2 | * | 1/2007 | de Roest | 416/244 R |
| 7,866,121 B2 | * | 1/2011 | Polyzois et al. | 52/848 |
| 8,272,173 B2 | * | 9/2012 | Jakubowski | 52/40 |
| 8,713,892 B2 | * | 5/2014 | Uebbing et al. | 52/745.17 |
| 2005/0160697 A1 | * | 7/2005 | Oliphant et al. | 52/731.4 |
| 2008/0313972 A1 | * | 12/2008 | Grob et al. | 52/40 |
| 2009/0266004 A1 | * | 10/2009 | Willey et al. | 52/40 |
| 2012/0311948 A1 | * | 12/2012 | Hangel | 52/295 |
| 2014/0157715 A1 | * | 6/2014 | Wagner | 52/651.07 |

FOREIGN PATENT DOCUMENTS

DE         19832921 A1  *  2/2000 ............. E04H 12/12

OTHER PUBLICATIONS

Machine translation of DE 19832921 A1, date pulled Aug. 21, 2014, p. 1-3.*

* cited by examiner

*Primary Examiner* — Elizabeth A Plummer
(74) *Attorney, Agent, or Firm* — Stephen C. Beuerle; Procopio Cory Hargreaves & Savitch LLP

(57) ABSTRACT

A hybrid wind turbine tower support structure that combines pultruded fiber glass composites lineals with reinforced concrete, effectively creating a low cost structure for holding large, laterally-forced-thrusts from wind turbine rotor blades. The structure is designed to be lower in installed costs then its counterpart steel support structure, yet be capable of withstanding very large thrust loads, deflecting-under-load less than or equal to, but no more, under extreme wind loading, than its counterpart, steel support structure.

15 Claims, 13 Drawing Sheets

HYBRID POLE STRUCTURE AND METHOD OF ASSEMBLY

FIELD OF THE INVENTION

The present invention relates to composite hybrid wind turbine tower support structures.

BACKGROUND OF THE INVENTION

The wind turbine industry, both land-based and off-shore, has extended into an economic scaling business, where larger blade systems and larger output have lowered the installed cost per kilowatt/megawatt output. Where typical outputs of 1.5 MW/single turbine installations were common in the 1990s and early 2000s, the industry is pushing into the area of 5.0+MW/single wind turbine installations today. The ability to make blades nearly 265 feet in length, and longer, will require towers in excess of 300 feet in height. This will additionally have the rotor thrusts approaching as high as 220,000 lbs, resulting in base bending moments in excess of 67 million ft.-lbs. Needless to say, the steel pole structure conceptually designed by the Department of Energy (DOE) National Renewable Energy Laboratory (NREL) Technical Report NREL/TP-500-38060, February 2009, "Definition of a 5-MW Reference Wind Turbine for Off-Shore System Development" is a very significant steel pole structure at 347,460 kg in weight, and 87.6 meters in height above ground with a base diameter greater than 8 meters, and having a wall thickness of greater than 5 cm.

The challenges of such a pole are numerous. Extremely large sections of the steel plate, rolled into the correct diameter must be shipped to an installation site in partial sections, and then must be welded and assembled at site, requiring many days of on-site fabrication, with large equipment. Transportation limits by road on width and weight drastically affect the size of steel sections that can be moved to a site. This is because the sections of a steel tower/pole that can be shipped are limited by truck standards (with wide-load-restrictions and weight restrictions per axle). As larger and larger wind turbine rotors are designed, at taller and taller heights, this issue will only become more problematic.

Today, wind turbine structures can represent at least $\frac{1}{3}^{rd}$ the cost of the entire installed system. A need exists to provide larger tower/pole structures at a lower installed cost.

SUMMARY OF THE INVENTION

Accordingly, an aspect of the invention involves a hybrid wind turbine tower support structure that combines pultruded fiber glass composite lineals with reinforced concrete, effectively creating a low cost structure for holding large, laterally-forced-thrusts from wind turbine rotor blades. The structure is designed to be lower in installed costs then its counterpart steel support structure, yet be capable of withstanding very large thrust loads, deflecting-under-load less than or equal to, but no more, under extreme wind loading, than its counterpart, steel support structure. Additionally, as the industry advances to higher power-generation-levels and taller structures, there will be additional advantages to the use of the structure herein disclosed.

This hybrid structure combines pre-stressed or post-stressed reinforced concrete with fiber reinforced plastic ("FRP"), also known as composites). The two in combination provide a low cost hybrid structure that is significantly lower in cost than the steel equivalent structure. This is due to Portland Cement having a cost of approximately $0.04 per lb.

Additionally, the composite sections are transported to an installation site, whereupon the Portland Cement gets added via local construction contractors, or in a preferred case, an on-site batch plant, temporarily set up for multiple tower/pole structures. The Portland Cement can be added once the tower is installed (pumped up to 1000 feet vertically is possible and state of the art) or sections can be injected with Portland Cement while resting horizontally on the ground. Pre-stressed or post-stressed steel reinforcement must be added as is well known in the construction trades, and any reference to "concrete" herein shall assume to be reinforced with low-cost steel post-tension or pre-tension members.

Additionally, an embodiment is disclosed that demonstrates a unique system for off-shore deployment of very large turbine towers.

Another aspect of the invention involves a wind turbine comprising a wind turbine assembly; a hybrid wind turbine tower support structure supporting the wind turbine assembly, comprising: a plurality of vertically stacked hybrid wind turbine tower support structure modules, the vertically stacked hybrid wind turbine tower support structure modules each comprising a plurality of connected hybrid wind turbine tower support structure segments, the plurality of connected hybrid wind turbine tower support structure segments each comprising walls made of a fiber composite material; connection assemblies connecting the walls together in a complete circumference so that a void is formed between the fiber composite material walls; and concrete disposed within the void formed between the fiber composite material walls.

One or more implementations of the above aspect of the invention include one or more of the following: the fiber composite material includes a substantially rigid sandwich wall including sandwich skins, interior foam, and 3D fibers linking the sandwich skins; the fiber composite material is a pultruded fiber glass composite; the fiber composite material is a consumable form; the concrete is pre-stressed reinforced concrete and/or post-stressed reinforced concrete; the vertically stacked hybrid wind turbine tower support structure modules have a tapered configuration and slide into each other to vertically stack the hybrid wind turbine tower support structure modules together; or to be stacked vertically using longitudinal connections; the wind turbine is a land-based wind turbine installation; the wind turbine is an off-shore wind turbine installation; the wind turbine is an oceanic wind turbine installation; a method of assembly of the wind turbine comprising shipping the plurality of connected hybrid wind turbine tower support structure segments to a tower site by truck forming the plurality of vertically stacked hybrid wind turbine tower support structure modules one module at a time by erecting the plurality of connected hybrid wind turbine tower support structure segments; connecting the plurality of connected hybrid wind turbine tower support structure segments together with the connection assemblies to form a complete circumference with the void formed between the fiber composite material walls; and pouring concrete into the void formed between the fiber composite material walls at the tower site; forming the plurality of vertically stacked hybrid wind turbine tower support structure modules one module at a time includes forming a new hybrid wind turbine tower support structure module vertically on top of a previously formed hybrid wind turbine tower support structure module; and/or the hybrid wind turbine tower support structure modules have a tapered configuration and further including sliding the hybrid wind turbine tower support structure modules into each other to vertically stack the hybrid wind turbine tower support structure modules together.

Another aspect of the invention involves a wind turbine comprising a wind turbine assembly; a hybrid wind turbine tower support structure supporting the wind turbine assembly, comprising plurality of vertically stacked hybrid wind turbine tower support structure modules, the vertically stacked hybrid wind turbine tower support structure modules each comprising an inside pole member and an outside pole member made of a fiber composite material and serving as an interior wall and form and an exterior wall and form of the hybrid wind turbine tower support structure; a substantially annular space defined between the inside pole member and the outside pole member; and reinforced concrete disposed within the substantially annular space defined between the inside pole member and the outside pole member.

One or more implementations of the immediately above aspect of the invention include one or more of the following: the fiber composite material includes a substantially rigid sandwich wall including sandwich skins, interior foam, and 3D fibers linking the sandwich skins; the fiber composite material is a pultruded fiber glass composite; and/or the concrete is one of pre-stressed reinforced concrete and post-stressed reinforced concrete.

BRIEF DESCRIPTION OF DRAWINGS

The accompanying drawings, which are incorporated in and form a part of this specification illustrate embodiments of the invention and together with the description, serve to explain the principles of the invention.

DETAILED DESCRIPTION OF PREFERRED EMBODIMENTS OF THE INVENTION

With reference initially to FIGS. 1A-3B and 6A, an embodiment of a hybrid wind turbine tower support structure or pole 20 (also referred to herein as pole structure, hybrid pole, pole) will be described. As described earlier, the state-of-the-art for wind turbine towers is a structure designed and fabricated with tubular, tapered steel poles. These poles are multi-sided, with either circular or segmented flat sections, that are hollow and can have a base-wall-thickness up to 2.0 inches or more. The hybrid wind turbine tower support structure 20 has the following advantages over state of the art steel tubular tapered steel poles:

1. By combining the corrosive resistant, high strength of composite materials with the low cost and high stiffness of concrete (e.g., Portland Cement) with up to 8000 psi compression strength or more, a hybrid wind turbine pole can be fabricated and assembled that fully meets the strength and stiffness of a state-of-the-art steel pole structure. And this can be achieved at a lower material cost than a steel pole-equivalent structure.

2. The hybrid wind turbine tower support structure 20 is capable of providing a higher elevation for a wind turbine relative to a ground-plane, where wind velocities are higher as is generally known and documented in environmental science having documented the ever-increasing wind-speed gradients with distance above a ground-plane.

3. The hybrid wind turbine tower support structure 20 can be transported to a field site in sections which, after field assembly, will allow taller and stronger poles than can practically be achieved in steel, resulting in advantages as the industry attempts to achieve sizes that approach 10 MW wind turbines.

4. Since the cost of Portland Cement is so low, the hybrid wind turbine tower support structure 20 can provide an economic support structure that is lower in cost to a steel pole, thus enabling a positive economic prospect for a wind turbine electric production site. The steel pole can often represent up to ⅓rd the installed cost of the entire installation.

5. For marine environments the composite material exterior-consumable-form can provide superior corrosion resistance in a salt-water and off-shore installations.

Figure 1A:
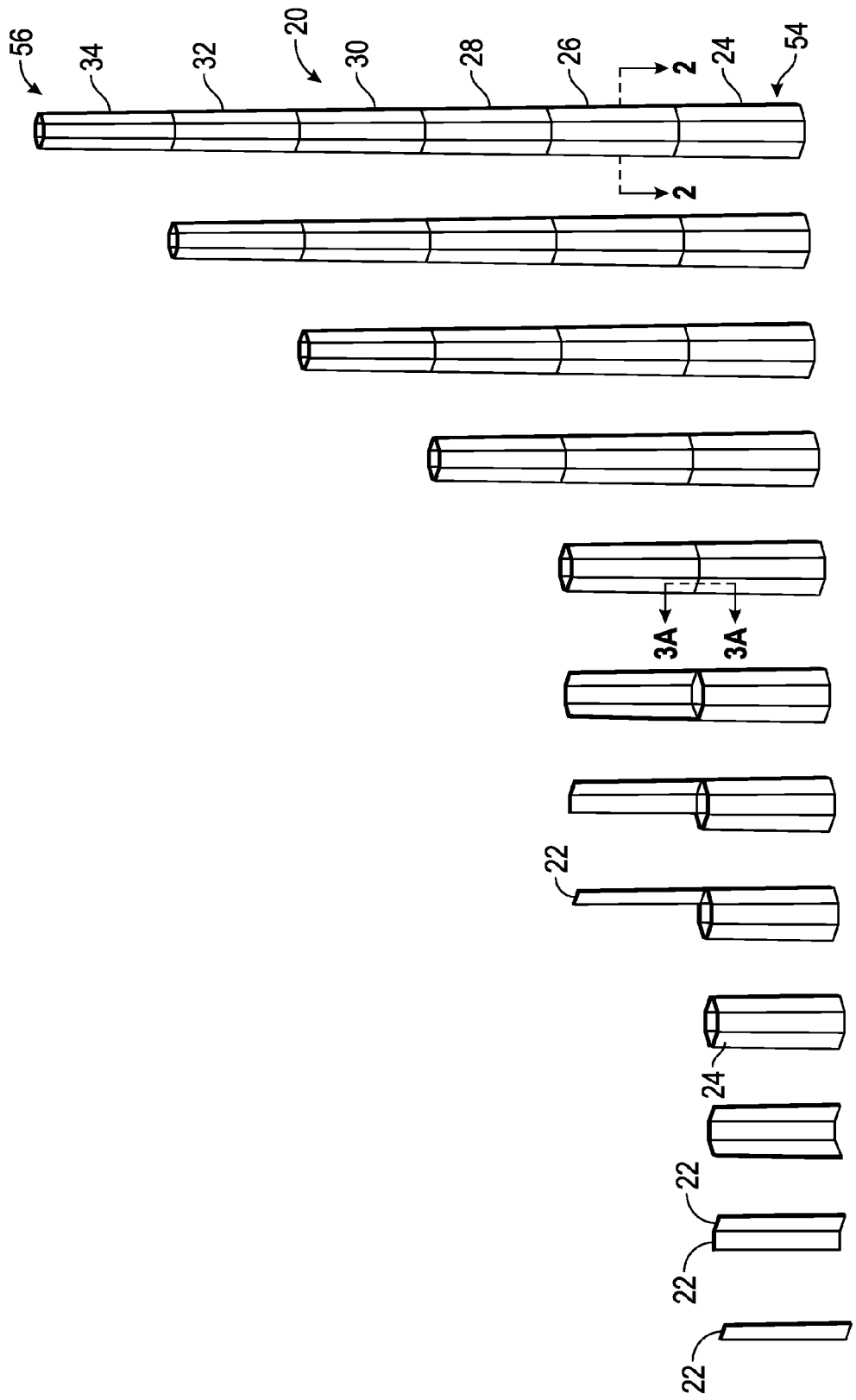
FIG. 1A shows an isometric rendering of sections of an embodiment of a hybrid pole structure, as it might be assembled in the field, erecting segmented sections of, for example, an eight-sided pole with six vertical modules, when installed, reaching 300 feet in height, for example, although it could clearly be 12-sided or 16-sided, for example.
Figure 1B:
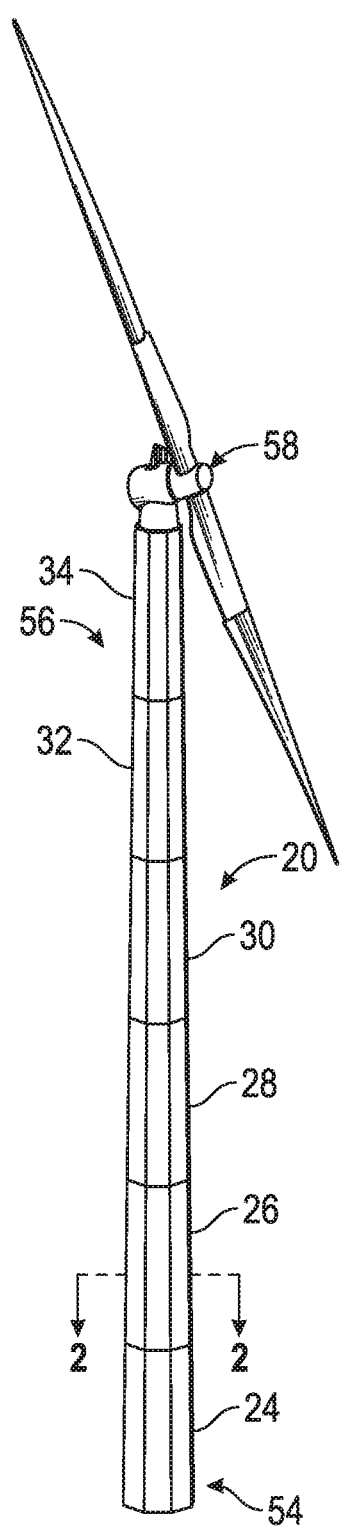
FIG. 1B is a perspective view of the tower/pole structure of FIG. 1A with rotating wind turbine assembly with blades shown.

Referring once again to the eight-sided hybrid wind turbine tower support structure or pole structure 20 of FIG. 1A, note the segments/sections 22 of this pole 20 are in the embodiment shown, for example, 50 feet long, and at the base of the pole 20 may be, for example, 8 feet wide (or more). In an exemplary method of installation/assembly, the segments 22 are assembled in a fashion as shown in FIG. 1A, first circumferentially assembling the eight segments, creating a first pole module 24 with the first 50 feet of tapered height, and then sequentially installing another pole module 26 with the second 50 feet of tapered height (via a crane) and so on, until 6 pole modules 24, 26, 28, 30, 32, 34 have been installed to create a 300 foot hybrid pole 20. In one or more embodiments, the number of segments/sides 22 of the pole 20 are 12, 18, 24, or more, depending upon the diameter and the preference, but it should be recognized by those skilled in the art that this entire application, with figures, defining either an 8-sided or 12-sided pole is easily adjusted for larger number of sides, whereupon angles are adjusted to accommodate a complete circumference.

In an exemplary embodiment, the hybrid wind turbine tower support structure 20 is at least partially constructed of a composite material (e.g., incorporating e-glass fibers and vinyl ester resin) having a much lower Modulus of Elasticity than that of steel pole structures. In fact the Modulus of Elasticity of composites is as much as 7-times lower than steel, depending on composite fiber volume and fiber orientation (known in the industry as "ply-schedule"). However, the ultimate strength of the composite can actually exceed the ultimate strength of steel (i.e., can have an ultimate tensile stress higher than steel).

Since deflections at the top of each pole 20 due to the same ground-line moment are directly proportional to the product of the Modulus of Elasticity and the section modulus, the pole structure 20 is designed to increase the section modulus by the same factor that the Modulus of Elasticity is reduced (due to substitution of material). A hybrid design is disclosed that has a substantial wall thickness, the bulk of which is accomplished via a relatively thick section of reinforced concrete 52. This section is created between two walls 38, 40 of corrosion-resistant composite material. The composite material is the equivalent of a "consumable-form" as it is fabricated, in one embodiment, with just enough mass and stiffness to allow the use of post-tensioning steel rods and the injection of Portland Cement (concrete) at the installation site. In this way the composite shell can be transported great distances by road, and then the final concrete injection would take place directly next to the pole or tower foundation. Once cured, and after reinforcement bars are post-tensioned, for example, over a sufficient number of days, the sections of the reinforced hybrid pole 20 can be assembled on the traditional foundation using crane-hoisting-techniques.

Multiple finite element analyses (FEA) on this new type of pole structure 20 for wind turbines concept was performed and full-scale sections of some of the components were tested.

The result was the development of a structural equivalent of a steel pole tower used in wind turbine installations. FIG. 1A shows a general assembly method for the multiple segments/sections 22 and multiple pole modules 24, 26, 28, 30, 32, 34 of the pole 20. FIGS. 2-3B, and 6A depict various embodiments of the details of the pole 20, a walled cross section, and a longitudinal and circumferential joint system.

Referring back to the Background of the Invention, reference is made to the 5 MW baseline report issued by the US NREL. Note this report gives a baseline tower that should be considered. From this report, one can see the baseline tower constructed out of steel weighs 347,460 kg or 764,412 lbs. At a conservative material cost in 2013 dollars of $1.20/lb., this would imply the tower material cost would be $917,294.

For a structural equivalent tower in accordance with the hybrid pole structure 20 disclosed herein, the estimate of material cost for an equivalent hybrid structure, after running detailed FEA reviews is $345,900. This is a material cost that is 37.8% of the cost of current technology. Since every renewable energy project only becomes viable with positive economic returns, and with wind projects currently showing very marginal returns in today's dollars, it is extremely important to find new and innovative concepts to replace the traditional old technologies. A tapered steel pole is a proven and old design, but if it can be replaced with a hybrid design that costs only 38% of the steel design. Thus, the hybrid wind turbine tower support structure 20 represents a new and important advancement in an entire wind turbine power generation system.

Furthermore, the hybrid wind turbine tower support structure 20 lends itself to both land installations and off-shore installations. Much interest has been generated lately in oceanic and off-shore wind turbine installations. This is due to multiple drivers. The towers can be located away from populated land-sites, perhaps out of view from even the shoreline. Winds off-shore have been shown to be more consistently stronger and more predictable. Off-shore installations could represent the largest siting location globally, as a majority of the Earth's surface is the world's oceans.

The hybrid wind turbine tower support structure 20 is ideally suited for off-shore installations. First, the interior and exterior are 100% corrosion resistant to salt water. Secondly, joint/connection systems 80, 190 of the hybrid wind turbine tower support structure 20 maintain the corrosion resistant integrity of the structure. Thirdly, the hollow interior of the pole 20 is used for multiple ballasts and floating sections, such that the hybrid pole is used as a floating tower, with no other foundation needed, and could be in fact floated in and out of port in a vertical manner, completely installed with the wind turbine generator and blades, returned for maintenance, and then re-deployed to deep water. The ballast and buoyancy schemes allow for a lowering of the height of the tower in strong winds, such as hurricane force winds, thus limiting potential damage to the turbine or rotors (blades).

Numerous embodiments are possible of the hybrid pole structure 20. The figures disclosed herein represent just a few of the embodiments. The starting point in the assembly of the hybrid wind turbine tower support structure 20 is two composite poles members 38, 40 of different diameters, essentially, an inside pole member 38 inside an outside pole member 40. These pole members 38, 40 serve as an interior wall and an exterior wall of the hybrid wind turbine tower support structure 20. An annular space, where concrete 52 is added, in between the two walls 38, 40 serves as an area where reinforced steel post-tensioning or pre-tensioning rods 196 (FIG. 6A) are installed, along with high compressive strength Portland Cement 52. A means for preventing separation of the concrete 52 from the composite walls 38, 40 is incorporated, as is well developed in the trades. The composite walls 38, 40 are the composite consumable forms for determining the spaced relationship of concrete annulus 52.

Some of the embodiments show sophisticated interior and exterior walls on the hybrid pole structure using another technology known as TRANSONITE, a lightweight composite sandwich panel with 3-dimensional fibers sold by Ebert Composites Corporation of Chula Vista, Calif. This fiber composite material includes a rather rigid sandwich wall that has skins, interior foam, and 3D fibers linking the sandwich skins. This fiber composite material is used in the walls 138, 140 FIGS. 4-5B). There are advantages to incorporating such substantial walls 138, 140 in the hybrid pole structure, including rigidity during assemble and during a concrete injection at site. On the other hand, another embodiment disclosed (See FIG. 3A) depicts a very thin composite skin for both the inside and outside of the hybrid pole. This latter embodiment requires augmented stiffening to retain its shape, but would alternately have the advantage of lower weight and cost of the walled sections.

Other embodiments describe specific manners and methods of attaching segmented pole sections when erecting the hybrid pole. Any of these are viable, and additionally, connections could be made with traditional fastening methodologies.

Before describing the various figures herein, advantages and features of the hybrid pole structure 20, as well as alternate applications for the technology, are:

The hybrid wind turbine tower support structure 20 creates a tapered annular space via an inside surface of other wall 40 and an outer surface of inner wall 38; the hybrid wind turbine tower support structure 20 is tapered and can be 500 feet long, with a base of 30 feet in diameter or more; the composite segments/sections 22 are trapezoidal and are assembled at site; and there is a means for spatial separation of the inside and outside composite walls (referred above as composite pole inside a composite pole).

In the internal cavity, is placed post-tensioning bars and concrete (Portland Cement) wherein the Modulus of Elasticity is increased in the full hybrid structure, and the post tensioning assures the design will always have the concrete in compression, even on the "tension" side of the pole.

Special features are added to prevent the concrete from separating from the composite walls 38, 40.

The hybrid wind turbine tower support structure 20 are assembled and installed vertically, with concrete pumped into the full cavity; but in the preferred embodiment, the sections of the hybrid wind turbine tower support structure 20 are fully injected with concrete at ground level, are allowed to reach a minimum cure and then are erected into a completed hybrid wind turbine tower support structure 20.

In an off-shore application, the hybrid wind turbine tower support structure 20, when completed, is floated vertically off-shore.

Ballast cavities are added to assure neutral buoyancy and to adjust height of the hybrid wind turbine tower support structure 20 in normal or adverse wind conditions. The ballasts can be used to augment the transportation and installation of an off-shore hybrid pole.

The wind turbine assembly 58 including a wind turbine generator is mounted on the top of the hybrid wind turbine tower support structure 20 and steel structure can be added as necessary to assist with the generator installation.

An internal ladder is installed for maintenance personnel and for assistance on installation.

The hybrid wind turbine tower support structure 20 is tethered to the ocean floor by known means, such as available in the off-shore oil and gas industry.

Below the ocean surface, means are deployed for preventing ocean currents from applying torque to the hybrid wind turbine tower support structure 20 and causing a twisting of the wind turbine tower.

In one embodiment, this counter torque device is a series of "arms" that counter torque from one side of the hybrid wind turbine tower support structure 20.

The hybrid wind turbine tower support structure 20, when installed off-shore, is towed into port for maintenance, and then redeployed, and is accomplished while the hybrid wind turbine tower support structure 20 is vertical, assuming the port has no height restrictions.

The hybrid wind turbine tower support structure 20 will have a connection means for connecting hybrid pole modules 24, 26, 28, 30, 32, 34 at the site of installation, wherein a sequential installation may involve connecting one level (say the 0-foot-to-50-foot level) of the hybrid pole until a circular complete pole module 24 is completed, and then a means for hoisting, connecting, and installing a second level 26 (say the 50-foot-to-100-foot level) in the same manner and so-on, until the entire hybrid wind turbine tower support structure 20 is constructed.

The connection means may be a circumferential joining system or bonding system and may be a longitudinal connection system or a simple overlap of sections.

Furthermore, in alternative embodiments, the connections of all hybrid pole modules 24, 26, 28, 30, 32, 34 take place with no concrete, the pole 20 assembled vertically and then concrete pumped vertically into all interior cavities, with post-tensioning bars tensioned after the initial cure of the concrete.

The pole sections/segments 22 fit truck transportation with weight and width limits of US highways. A wind turbine pole site is selected and prepared. The pole sections/segments 22 are delivered very close to the designated assembly area. Afterwards, the pole sections/segments 22 are prepared with post-tensioning bars and injected with concrete. In this way, although the weight of each section/segment 22 can be substantial, the transportation restrictions are avoided. Concrete trucks deliver the Portland Cement to the site or a batch plant erected at the site. With multiple wind turbine poles 20 at a given site, a batch plant makes economic sense in many circumstances.

All connections are mechanical, bonded, friction, or a combination of any of the three.

A water-tight connection is provided such that the inherent corrosion resistance of the composite material is preserved and maintained.

In alternative embodiments, although the hybrid wind turbine tower support structure 20 is described as a wind turbine hybrid pole structure, the hybrid wind turbine tower support structure 20 is integrated into other applications, such as: a) A straight version of this hybrid pole (un-tapered) is used for an underground sewer or water pipe and is corrosion resistant, and with a 200+-year-life; b) a straight version of the hybrid pole is used, either below ground or above ground, as a conduit carrying multiple utilities over great distances, including electrical, gas, water, sewer, for example); c) vertically, a 12-foot tall version of this hybrid pole, and 300-feet in diameter, is used to fabricate a holding tank for water effluent from, for example, natural gas fracking wells, or oil fracking wells, wherein 2 million gallons of water are required to frac one well, and a 12-foot high by 300 foot diameter tank could hold over 2 million gallons of water, for later purification, or for operations. The tank is set on the ground and a chemical-resistant liner is incorporated and used to collect all water effluent and prevent loss of fluids to the environment, d) the hybrid wind turbine tower support structure 20, made to the same strength specifications as steel, but at 38% of the material cost of steel, is an attractive improvement on the state of the art of many structures, as mentioned above, and is a significant improvement over current technology.

Having described the broad features, functions, and benefits of the hybrid wind turbine tower support structure 20, the figures will be described in more detail in turn below:

FIG. 1A depicts eight segments/sections 22 of one level or module 24 of the hybrid wind turbine tower support structure 20 and the sequence of adding new levels/modules 26, 28, 30, 32, 34, until six levels have been added. In alternative embodiments, there are more or less than eight segments/sections 22 that produce generally a circular module 24, but FIG. 1A depicts eight segments/sections 22. Also, in alternative embodiments, there are more or less than six levels/modules 24, representing the height, for example, of the hybrid wind turbine tower support structure 20.

FIG. 1A, on the extreme left portion of the figure, depicts a single wall segment/section 22. In the embodiment shown, this is a hybrid section with composite walls and interior concrete and reinforcement, and is 50 feet long and 8 feet wide and has a concrete thickness of 7.5 inches. The design is such that as segments 22 are added, such as seen on the right side of FIG. 1A, a taper exists on the hybrid pole 20 and the effective diameter is being reduced, as is common in a tapered pole, and additionally, the 7.5 inch thickness of the concrete section 52 is reduced gradually as the pole height is extended, or not, as the economics of the design dictate. However, the flexibility to the designer of the wind turbine pole 20 is apparent as the Section Modulus can be adjusted by either varying the diameter of the hybrid pole 20 with height or varying the concrete thickness with height.

The pole 20 of FIG. 1A is designed as a 48-segment pole, each segment 22 being 50-feet long and capable of mechanical assembly vertically, with the assistance of a crane and personnel on the inside of the pole 20, with scaffolding or ladders or the like. A hatch at the bottom level, allows egress and ingress for assembly and future maintenance. Effectively, the pole 20 shown in FIG. 1A has a 33 ft. diameter at a base 54, is 300 ft. tall, and has a diameter at a top 56 of 13 ft. (The diameter is defined as the circle diameter that is projected when connecting the outer most longitudinal sections with a circular arc, as will be shown in FIG. 2). The pole 20 of FIG. 1A utilizes 6000 psi concrete and utilizes multiple 1.25-inch post-tensioning bars. The skin thickness of the inner and outer composite FRP walls is 0.125 inches. Through finite element analysis (FEA), the maximum stress in the concrete is 1,889 psi, given a 67 million ft.-lb. moment due to the maximum rotor thrust of a 5 MW wind turbine assembly 58 (FIG. 1A), mounted at the top 56 of the 300 foot hybrid pole 20. There are sufficient factors of safety such that this hybrid pole 20 would qualify through structural civil engineering codes to be approved for installation in either land or off-shore installations.

Because light weight composite forms 38, 40 and/or segments 22 are easily shipped to installation sites at low cost, and then the pole segments 22 can be finalized with installation of post-tensioning bars, the addition of high strength concrete, and then finally, after sufficient days of curing be post-tensioned, the transportation of large quantities of concrete is avoided. Additionally, unlike steel, the burden of transporting prefabricated heavy and circular steel sections are avoided. Furthermore the limits on diameter of a steel pole are eliminated. And if the steel pole is to be welded in the field to produce large diameter sections, further fabrication problems exist for a steel pole.

Clearly, with the material cost of the hybrid pole 20 of FIG. 1A being at 38% of the material costs of a steel pole, and with the flexibility of extending beyond current state-of-the-art, by optionally providing the following two capabilities, the hybrid pole 20 is an attractive alternative for wind turbine installations. The two future capabilities that can now be exploited with the hybrid pole 20 are: a) the height of the pole 20 can be extended upwards, where the wind velocities are proven to be higher, and more average kilowatts can be generated over a given time-span, and b) there is really no limit on section modulus and diameter as the base 54 of the hybrid pole 20 can be expanded to diameters not practical in steel, and with concrete thicknesses higher, such that larger wind turbines, approaching 10 MW and more, in the future, can be accommodated, wherein the efficiency in terms of cost per installed-MW can be reduced. In this way, larger and larger systems will begin to favorably compete with alternative power plant efficiencies in coal and natural gas, and even nuclear electrical energy production.

The remaining figures depict close-up details of embodiments of sections of the hybrid pole 20. The objective of all assembly connections of the hybrid pole segments 22 is to assemble an entire pole in one day, with the assistance of a crane and 4 installation personnel.

Figure 2:
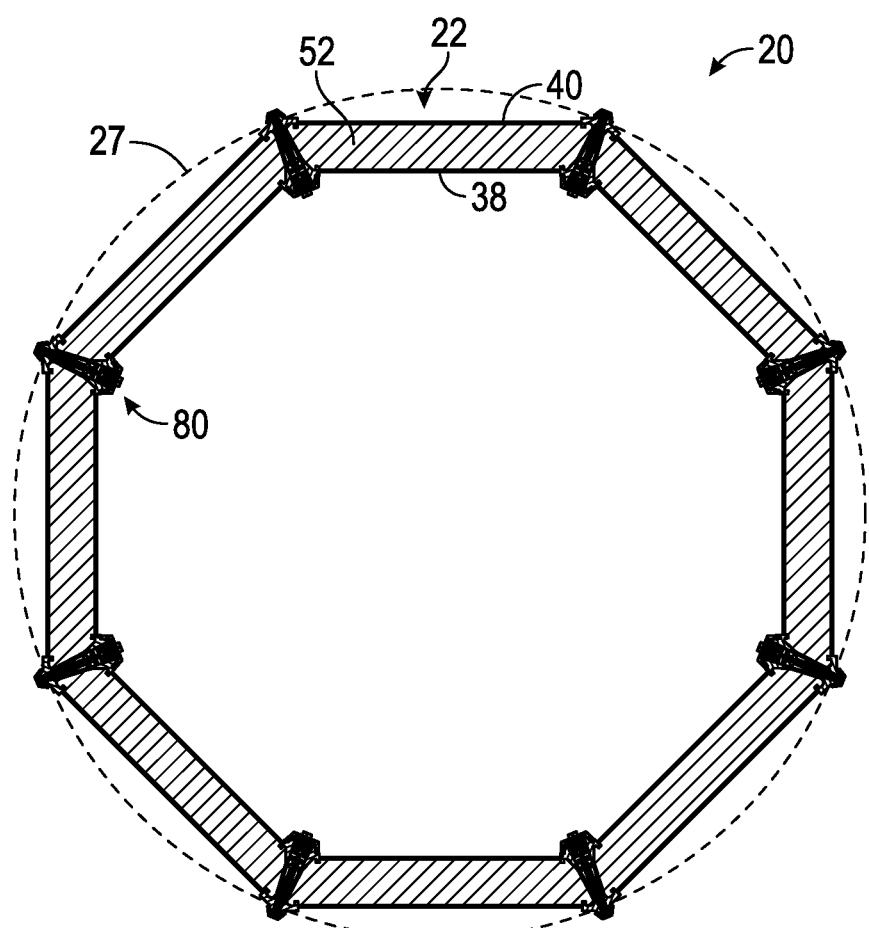
FIG. 2 shows a cross section of the pole of FIG. 1A taken along Section 2-2 of FIG. 1A, the connection shown being defined as a "circumferential connection".
Figure 3A:
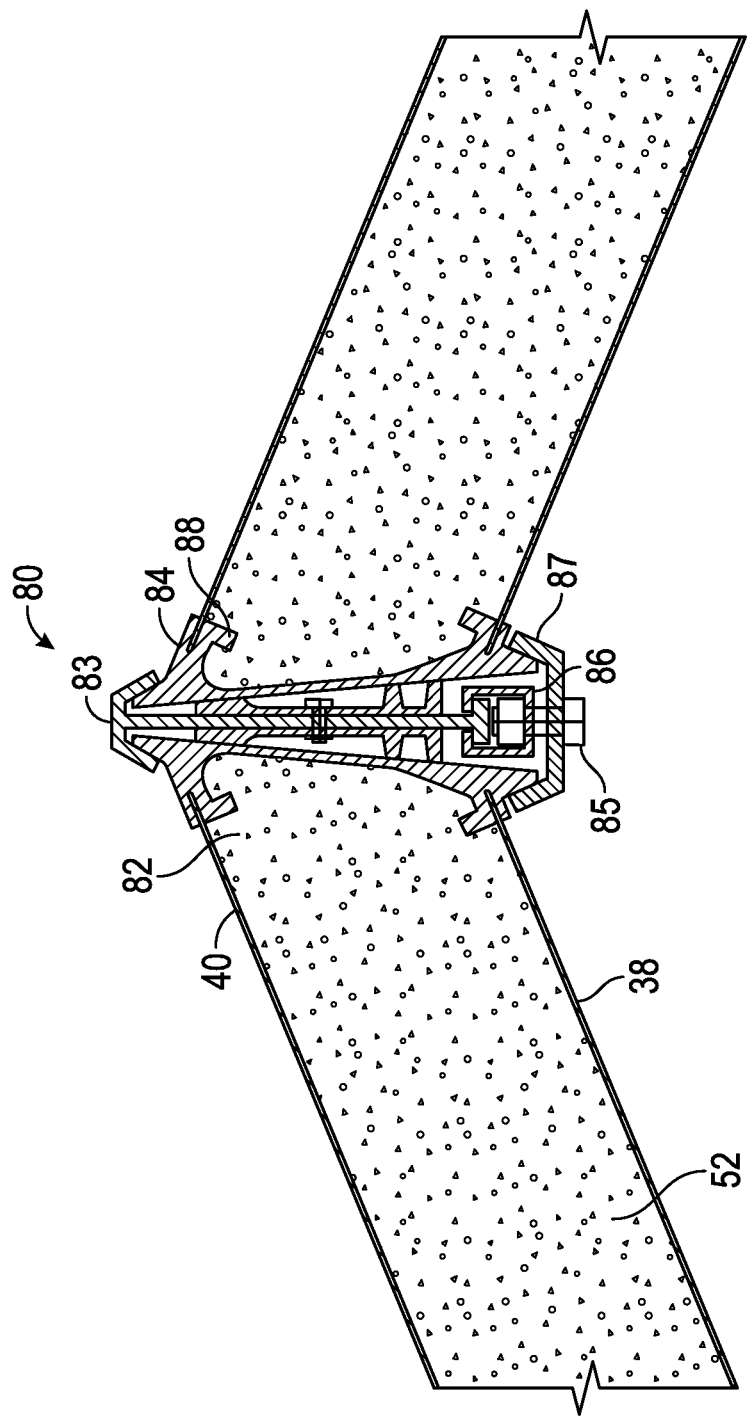
FIG. 3A shows a cross section of only one of the circumferential connections of FIG. 2, the connection again being defined as a "circumferential connection".

FIG. 2 shows a preferred embodiment of the hybrid pole 20 of FIG. 1A. Note the circular "diameter" 27 is defined as described earlier. The inner and outer walls 38, 40 are composite consumable forms, and the interior is intended to be high strength concrete. Not shown are the post-tensioning bars. With reference additionally to FIG. 3A, circumferential connection assemblies 80 constructed in accordance with an embodiment of the invention are shown. The circumferential connection assembly 80 includes an end pultrusion 84 that is a constant shaped FRP profile, as defined generally by the process of pultrusion, wherein inner wall 38 and outer wall 40 would be bonded in place over say a 50 foot section. Not shown are post-tensioning bars, which might be located, for example, every 3 feet and at the centers of equal area, throughout area 82 prior to the injection of concrete 52. A single segment of the 48-segment hybrid pole 20 of FIG. 1A might be an inner and outer wall 38, 40 bonded to two 50-foot long end pultrusions 84. In an exemplary method of assembly, this would be shipped to an installation site by a platform trailer, and multiple segments 22 stacked on the trailer 8 feet wide and 50 feet long. Since the cavity might be 7.5 inches-thick, it follows that it is possible a platform trailer could transport 12 composite sections 22 to a wind turbine installation site. In this way, only 4 platform trailers are required to deliver an entire hybrid pole 20 to a site. Once at the site, with the sections, 80, being horizontal on the ground, post-tensioning rods and concrete 52 are be added. The heavy sections would not need to be moved until the 8-hour installation by crane. In this way, there is no unnecessary hauling of heavy hybrid pole-sections.

Again, referring to FIG. 3A, one can clearly see the circumferential connection assembly 80, which would utilize assembly personnel inside the tower. In an exemplary embodiment, outer end section 83 and inner end section 87 are composite pultrusions, but in alternative embodiments, any corrosion resistant structural material is used. Essentially, the outer end section 83 is drawn inward by bolt 85, which when tightened, pulls on inner component 86, which not only draws outer end section 83 inward toward the center of the pole 20, but forces inner end section component 87 outward from the center of the pole 20. In this way, each end pultrusion 84 is engaged and drawn together circumferentially.

Figure 3B:
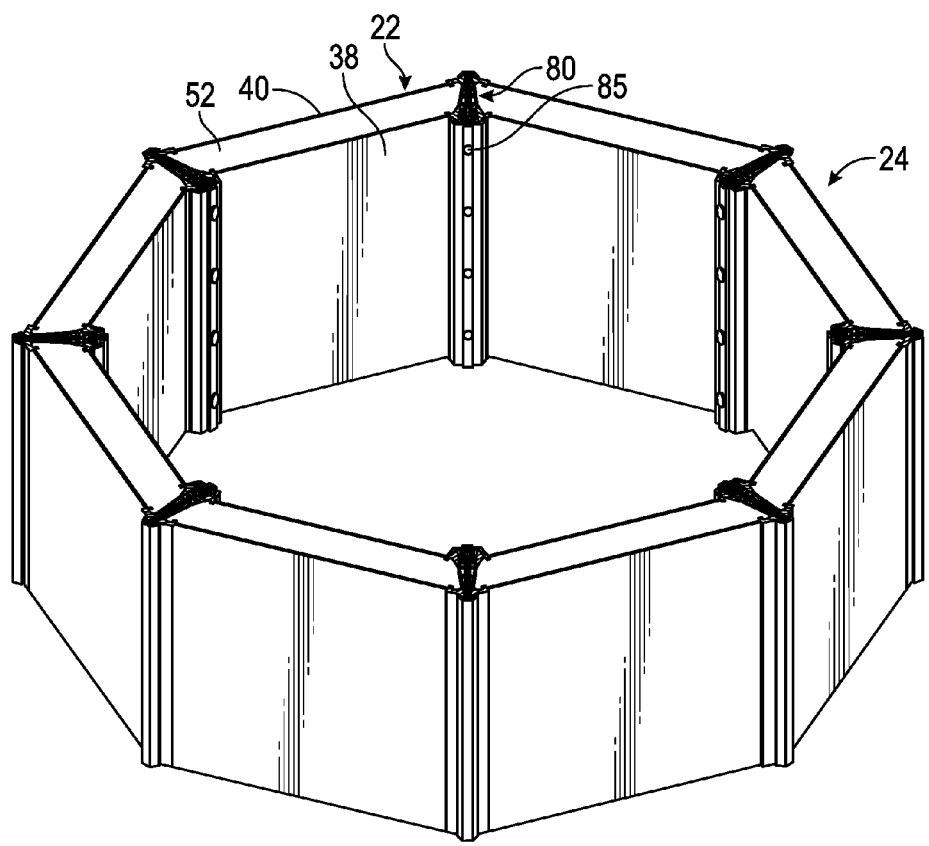
FIG. 3B is a perspective view showing an approximate 10-foot section of the 8-sided pole of FIG. 1A with shading for detail.

FIG. 3B shows a short vertical slice of an assembled hybrid pole module 24 using the circumferential connection 80 of FIG. 3A. Note this is only about a 10-foot vertical slice, and is only shown to provide an isomeric-understanding of the connection. Note the four bolts 85 on each circumferential connection 80.

Figure 4:
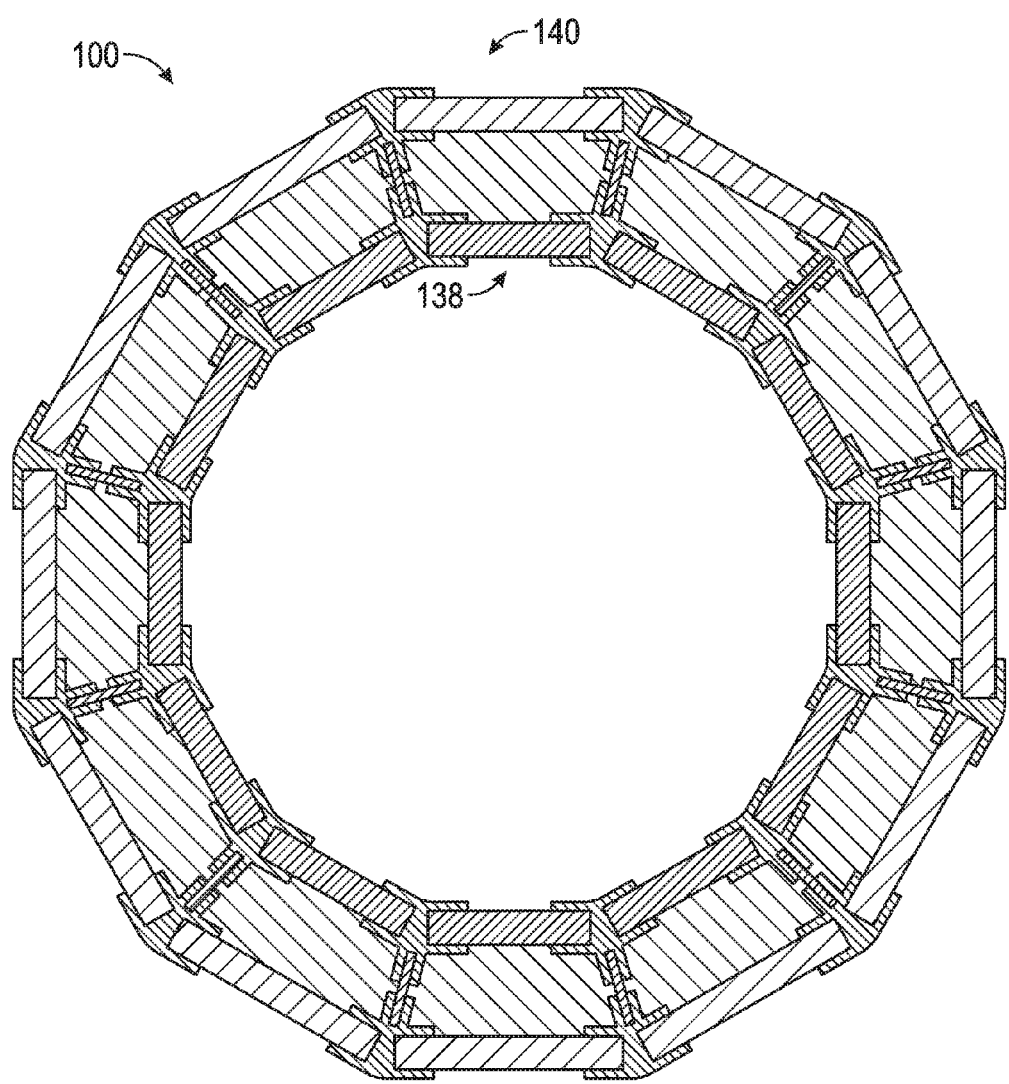
FIG. 4 shows a cross-sectional view, similar to FIG. 2, of a second embodiment of a hybrid pole structure, wherein there are 12 sides shown and the composite walls are thick composite sandwich panels similar to TRANSONITE, a lightweight composite sandwich panel with 3-dimensional fibers, rather than the thin composite walls shown in FIG. 2.
Figure 5A:
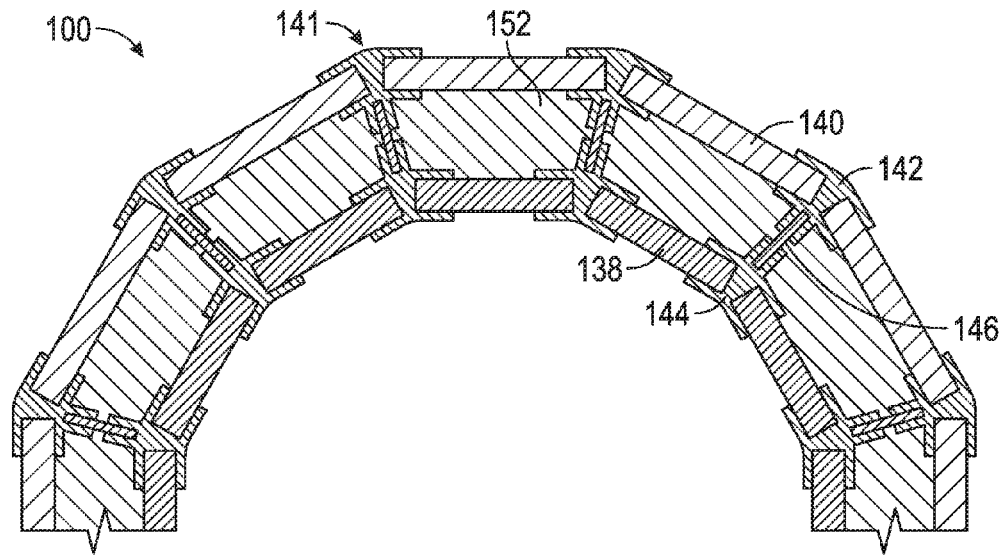
FIG. 5A shows a partial cross-sectional view of a single circumferential section, as depicted in FIG. 4.
Figure 12:
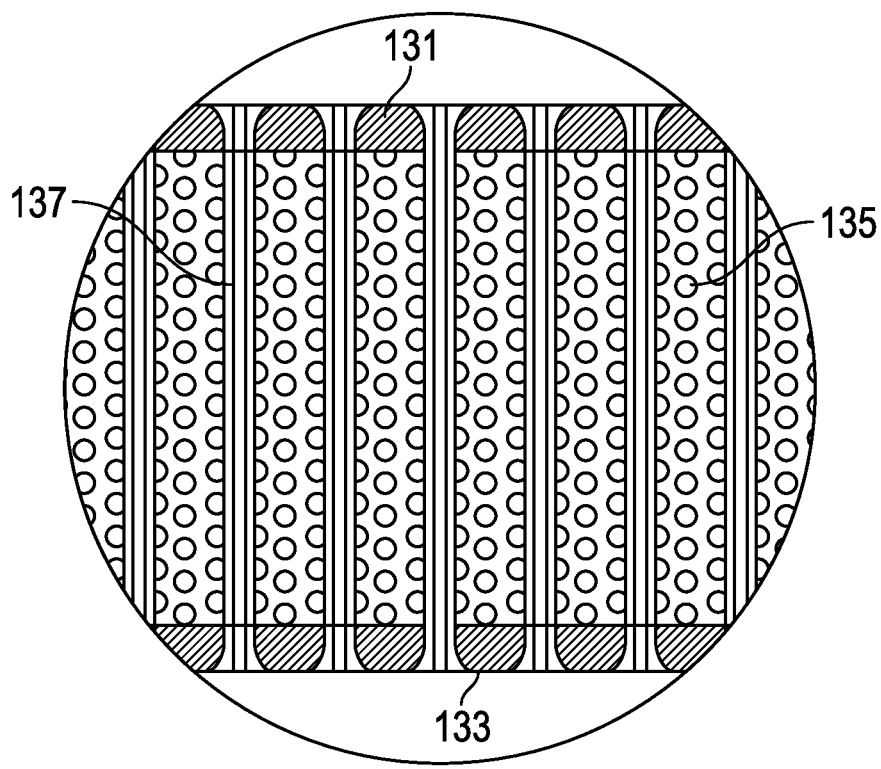
FIG. 12 shows a cross-sectional view of an embodiment of such a structural sandwich panel or fiber composite material wall.

FIG. 4 shows an alternate embodiment of a 12-sided pole 100, wherein the inner and outer walls 138, 140 are much more substantial in structure, and are in fact a sandwich structure. FIG. 4 is better understood when examining FIG. 5A, which shows a section of FIG. 4. There is shown an outer wall 140 and an inner wall 138, which are structural sandwich panels, and may be of the configuration of earlier U.S. Pat. Nos. 8,272,188, and 7,846,528, which are incorporated by reference herein. FIG. 12 shows an embodiment of such a structural sandwich panel or fiber composite material wall. Each wall 138, 140 includes a first sandwich skin 131, a second sandwich skin 133, interior foam core 135, and distinct groups 137 of 3D Z-axis fibers that extend from the first sandwich skin 131 to the second sandwich skin 133, linking the sandwich skins 131, 135 together. These are proven structural sandwich panels with over 500,000 square feet produced to date. These are produced in 8.5 foot widths and 50 feet long, and cut or machined into a taper. Also shown in FIG. 5A are circumferential connection assemblies 141 including outer connection 142, which are also described as outer-corner connection, which is bonded with outer walls 12 on either side. In the embodiment shown, outer corner connection 142 is a composite pultrusion, also capable of being produced in 50-foot sections. Also shown is inner corner connection 144, which is bonded to inner walls 138 on either side, and is also a composite pultrusion. Spline 146 is the final section and is a pultrusion of a given width that defines the cavity that accepts the injection of concrete 152. Spline 146 has a constant width or is tapered as the design requires for changing section modulus with changing hybrid pole height.

Figure 5B:
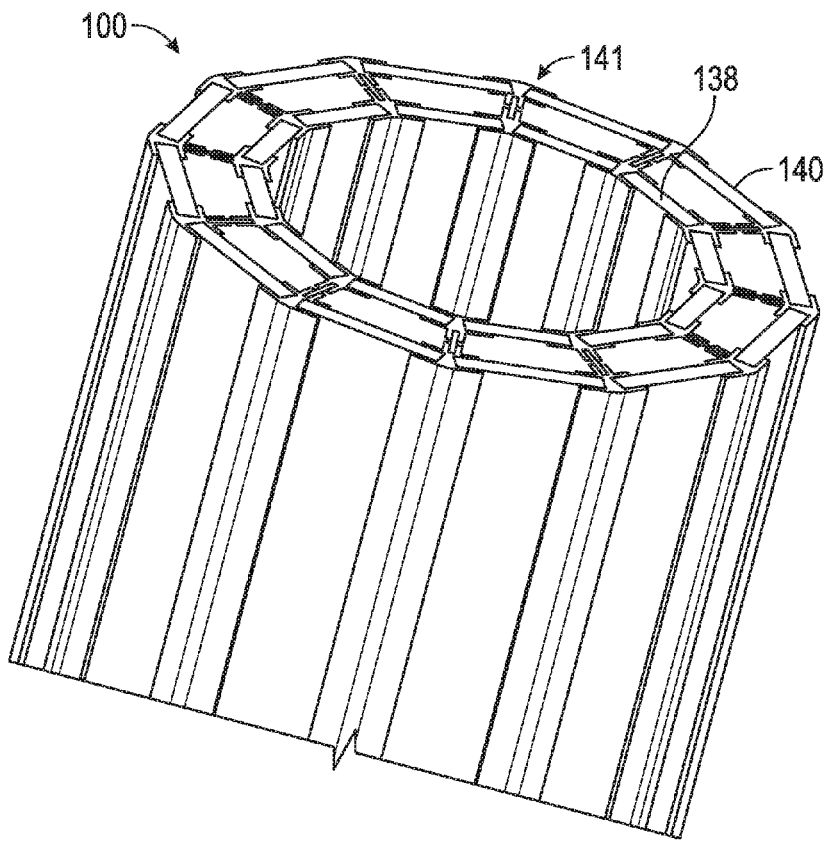
FIG. 5B shows a perspective view of the complete pole section of FIG. 5A.

FIG. 5B shows an isomeric sketch of the end view of FIGS. 4 and 5A. The pole 100 herein is bonded into a circumferential pole and is not intended to be assembled in sections. The hybrid pole 100 of FIG. 5B is preferably installed vertically, as will be described, and then post-tensioning bars added and concrete added after the pole 100 is made to stand vertically, but before it is loaded. The hybrid pole 100 of FIG. 5B consists of substantial composite contribution to resistance of bending moment, as opposed to the hybrid pole 20 of FIGS. 1 through 3B.

In an alternative embodiment, the structure shown in FIG. 4 forms a permanent water tank instead of a wind turbine pole. Instead of a hollow interior, the interior carries water.

In a further embodiment, the structure shown in FIG. 4 forms an underground utility pipe. Instead of a hollow interior, the interior carries water or one or more utility lines.

In still further embodiments, the structure shown in FIG. 4 is not a sandwich structure including concrete 152 between inner and outer walls 138, 140. Instead the structure only includes one set of the circumferentially spaced walls 138 or 140 that are joined together by corner connections 142 or 144. In such embodiments, the structure forms a temporary water tank, a frac tank, an underground utility pipe, or other circumferentially closed structure.

Although the structure in FIG. 4 is shown with twelve sides, in alternative embodiments, the structure includes other numbers of sides (e.g., 8 sides, 16 sides, etc.).

Figure 6A:
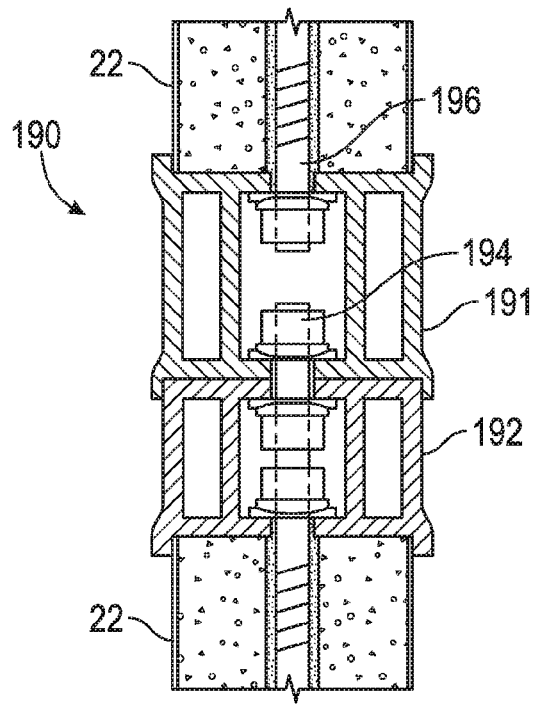
FIGS. 6A and 6C show cross-sectional views of two embodiments of a mechanical "longitudinal connection", as might be seen in Section 3A-3A of FIG. 1A, using traditional fasteners.
Figure 6C:
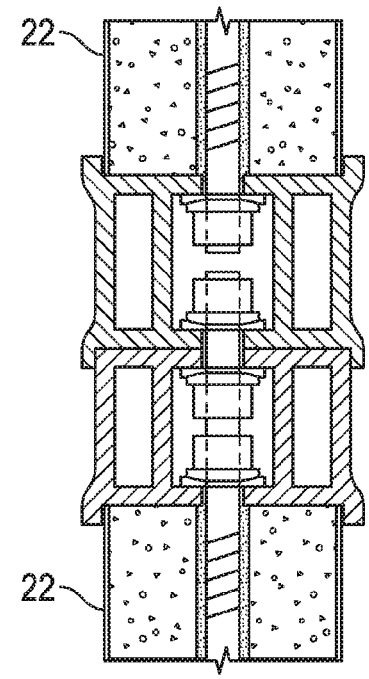
Figure 6B:
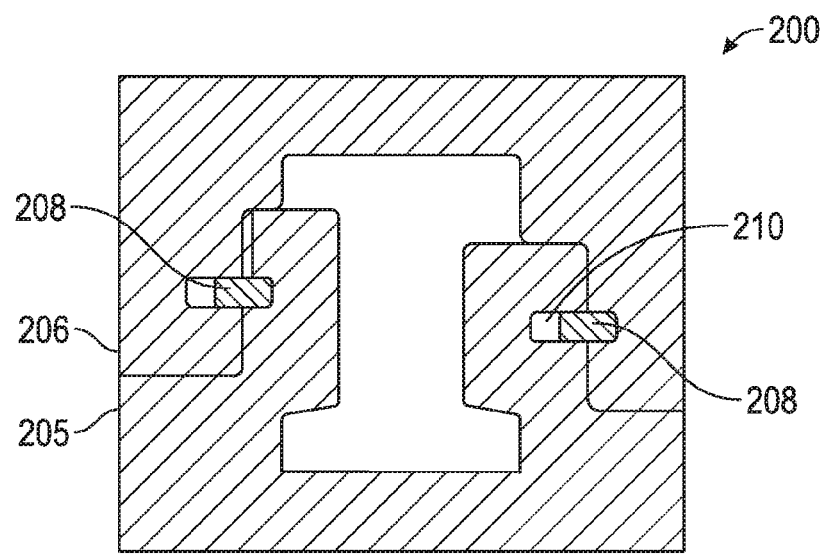
FIG. 6B shows a cross-sectional view of an alternative embodiment of a composite "longitudinal connection", including an innovative snap-lock connection.
Figure 7:
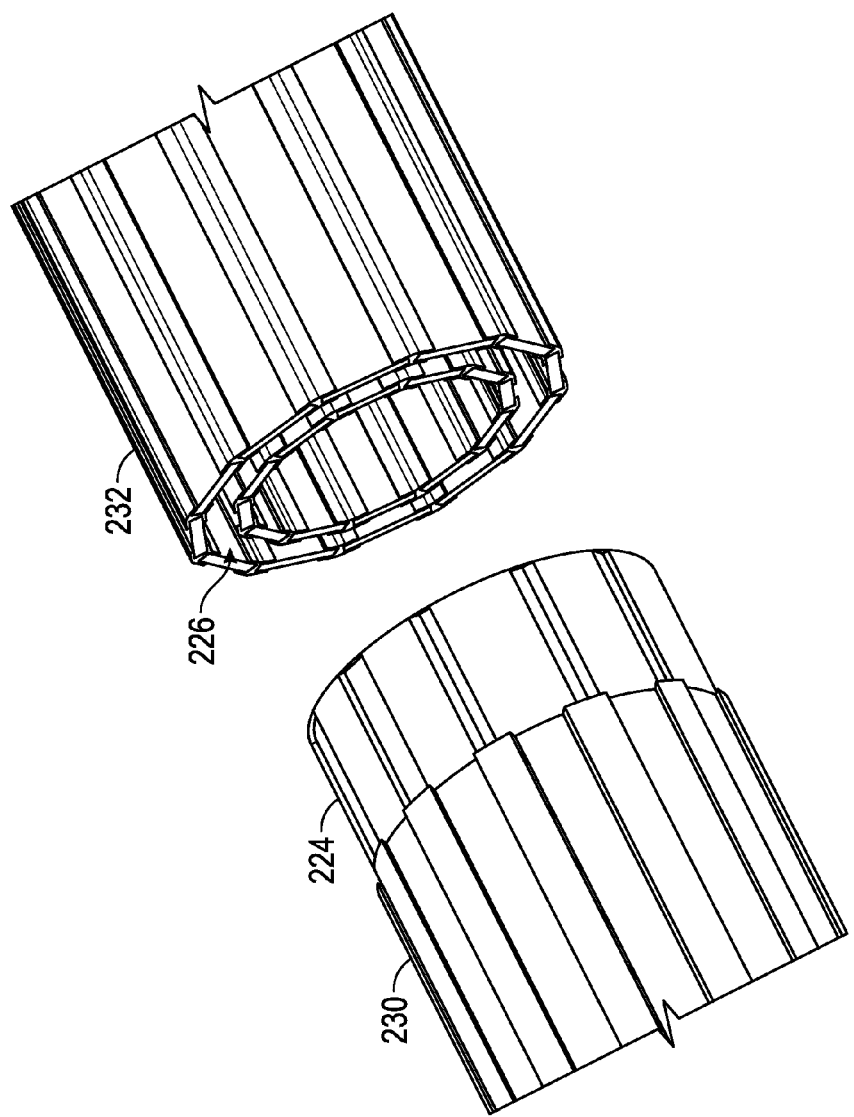
FIG. 7 shows a perspective view of an embodiment of a slip-fit connection that allows a longitudinal connection of a third configuration.

FIGS. 6A-6C show different longitudinal connection assemblies that might be seen as alternatives across section 3A-3A of FIG. 1A. Note the post-tensioning bars 196 actually attach to outer and inner connection components 191, 192. The connection components 191, 192 then encapsulate the ends of segments 22. A series of multiple connection bolts/nuts, periodically located around the circumference of the pole and identified as 194, are torqued tight by assembly personnel inside the hybrid pole. The right side of FIG. 6A shows an embodiment of connection component 191 having a smaller height than the connection component 191 on the left side of FIG. 6A.

FIG. 6B shows another embodiment of a longitudinal connection assembly 200 that is a composite alternative to the longitudinal connection, and is also intended to be a composite pultrusion. A cavity in the center is an area that houses the nuts that tighten post-tensioning bars. End cap 206, when brought together with a matting end cap 205, would then interlock by slide connections 208 that are moved in place by assembly personnel. Entire internal void 210 is then filled with grouting epoxy, to ensure the joint never separates, and that the salt water from an off-shore installation never penetrates the joint.

Figure 8:
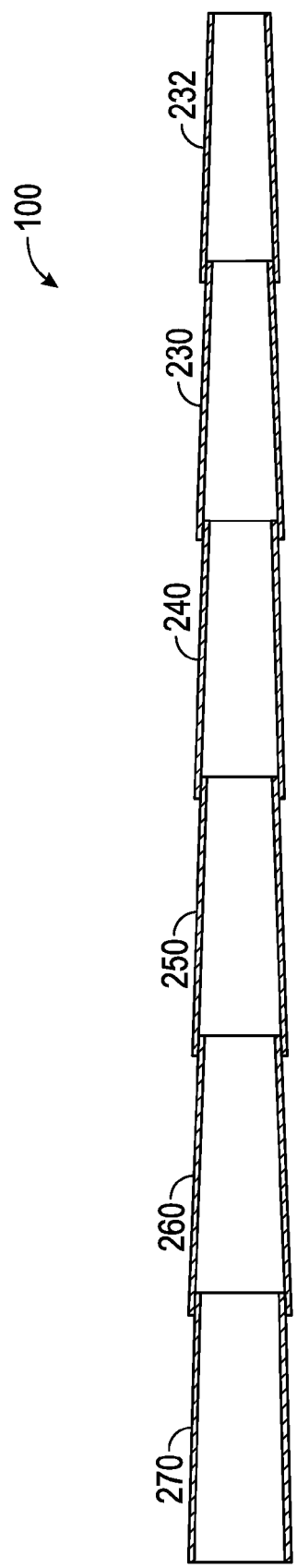
FIG. 8 shows a cross-sectional view of an embodiment of a hybrid pole structure including the slip-fit connections of FIG. 7.
Figure 9:
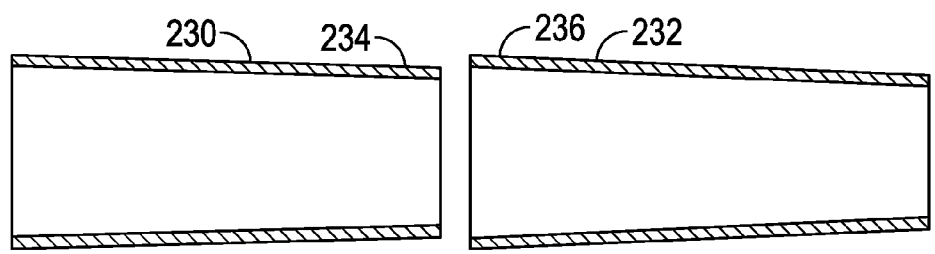
FIGS. 9 and 10 show cross-sectional views of a portion of the hybrid pole structure of FIG. 8, and depict further explanation of FIG. 8.
Figure 10:
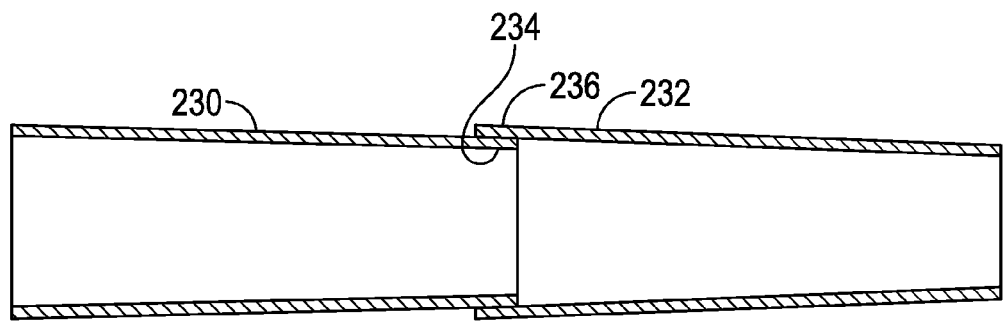
Figure 11:
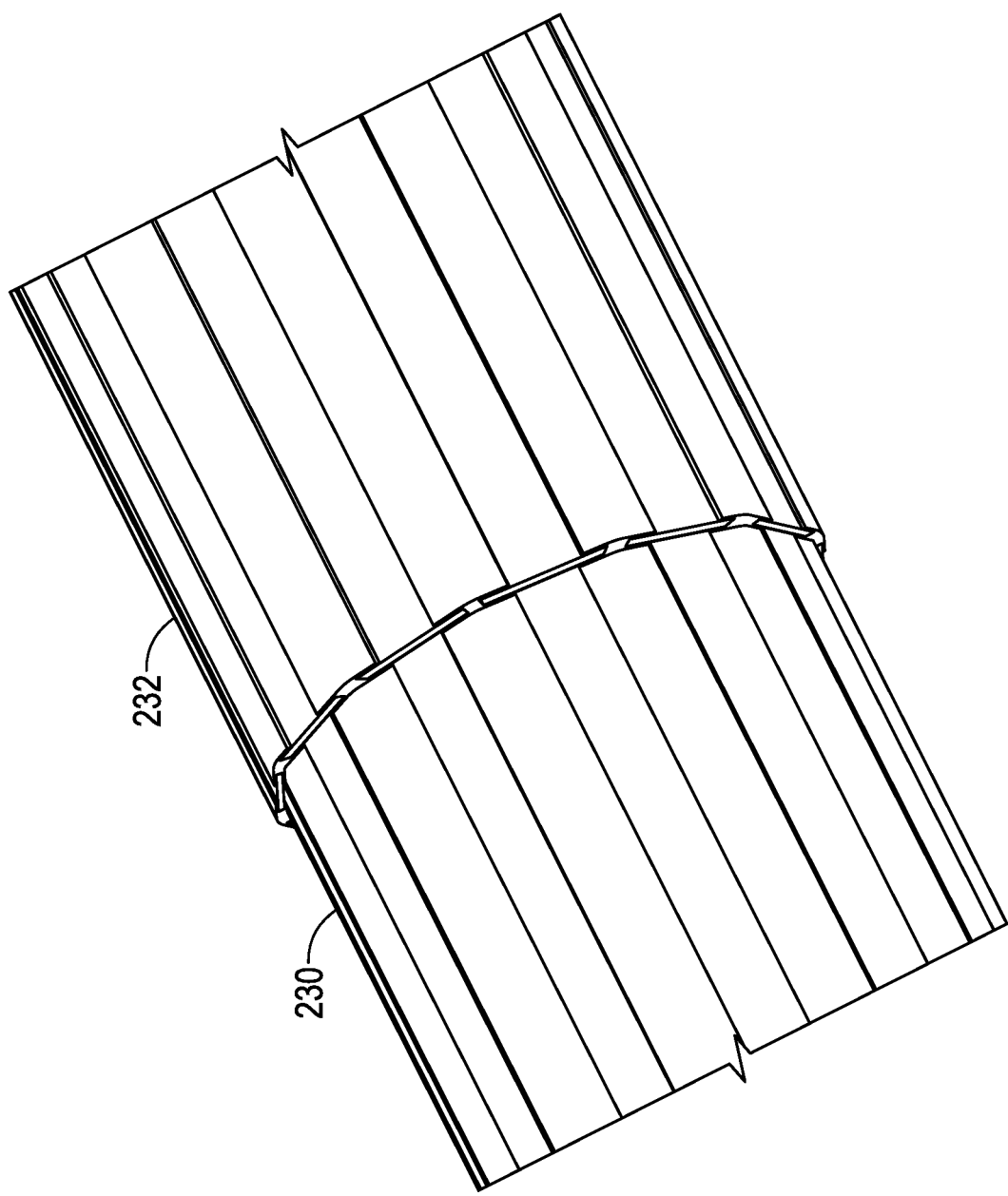
FIG. 11 shows a perspective view of a portion of an assembled pole hybrid pole structure of FIG. 7-10 with slip-fit connections shown in an assembled configuration.

FIGS. 7-11 show the pole 100 of FIG. 5B assembled with an overlap or slip-fit connection configuration to allow longitudinal connection of pole modules. In the embodiment shown including pole module 230 and pole module 232, it is clear that pole module 230 is machined to include protruding portion 224 that is inserted slightly into receiving portion 226 of pole module 232. As shown in FIGS. 9 and 10, pole module 230 includes an insert portion 234 that is received in, and overlapped by, receiving portion 236. Once inserted, such as shown in FIG. 11, post-tensioning bars are added, as well as concrete. In this design as well as the other, pre-tensioning bars, or an array of rebar may be placed according to the art of reinforced concrete, and may be desirable as an alternative. FIG. 8 shows diagrammatically how a tapered pole is erected with six pole modules overlapping, as shown with pole module 232 overlapping pole module 230, which in turn overlaps pole module 240, and remaining pole modules 250, 260, 270 having similar overlapping relationships. FIG. 9 shows a sketch of pole modules 230, 232 separated and FIG. 10 shows pole modules 230, 232 overlapped.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A wind turbine, comprising:
   a wind turbine assembly;
   a hybrid wind turbine tower support structure supporting the wind turbine assembly, comprising:
      a plurality of vertically stacked hybrid wind turbine tower support structure modules, the plurality of vertically stacked hybrid wind turbine tower support structure modules each comprising:
         a plurality of connected hybrid wind turbine tower support structure segments, the plurality of connected hybrid wind turbine tower support structure segments each comprising:
            an inner fiber composite material wall and an outer fiber composite material wall both made of a fiber composite material;
            connection assemblies connecting the inner fiber composite material wall and the outer fiber composite material wall together in a complete circumference so that a void is formed between the inner fiber composite material wall and the outer fiber composite material wall;
         concrete disposed within the void formed between the inner fiber composite material wall and the outer fiber composite material wall,
      wherein the connection assemblies include circumferential connection assemblies each having an elongated pultruded outer-corner connection bonded to the outer fiber composite material wall, an elongated pultruded inner-corner connection bonded to the inner fiber composite material wall, and an elongated pultruded spline connecting the elongated pultruded outer-corner connection and the elongated pultruded inner-corner connection.

2. The wind turbine of claim 1, wherein the elongated pultruded outer-corner connection and the elongated pultruded inner-corner connection both have an H-shaped cross-sectional configuration.

3. The wind turbine of claim 2, wherein the elongated pultruded outer-corner connection and the elongated pultruded inner-corner connection both include an elongated inwardly extending receiver having an elongated groove that receives the elongated pultruded spline.

4. The wind turbine of claim 1, wherein the fiber composite material is a consumable form.

5. The wind turbine of claim 1, wherein the concrete is at least one of pre-stressed reinforced concrete and post-stressed reinforced concrete.

6. The wind turbine of claim 1, wherein the wind turbine is a land-based wind turbine installation.

7. The wind turbine of claim 1, wherein the wind turbine is an off-shore wind turbine installation.

8. The wind turbine of claim 1, wherein the wind turbine is an oceanic wind turbine installation.

9. The wind turbine of claim 1, wherein the concrete is one of pre-stressed reinforced concrete and post-stressed reinforced concrete.

10. The wind turbine of claim 1, further including longitudinal connection assemblies for vertically connecting adjacent hybrid wind turbine tower support structure segments, the longitudinal connection assemblies encapsulating the lower and upper ends of adjacent vertically stacked hybrid wind turbine tower support structure segments and including post-tensioning fasteners for connecting the lower and upper ends of adjacent vertically stacked hybrid wind turbine tower support structure segments.

11. The wind turbine of claim 1, further including longitudinal connection assemblies for vertically connecting adjacent hybrid wind turbine tower support structure segments, the longitudinal connection assemblies include end caps for the lower and upper ends of adjacent vertically stacked hybrid wind turbine tower support structure segments, slide connections for connecting the end caps, and post-tensioning fasteners for connecting the lower and upper ends of adjacent vertically stacked hybrid wind turbine tower support structure segments.

12. The wind turbine of claim 1, wherein the inner and outer fiber composite material walls each include sandwich skins, interior foam, and 3D fibers linking the sandwich skins.

13. The wind turbine of claim 11, wherein the 3D fibers linking the sandwich skins include a plurality of distinct groupings of Z-axis fibers that extend from the first skin to the second skin.

14. A method of assembly of the wind turbine of claim 1, comprising:
   shipping the plurality of connected hybrid wind turbine tower support structure segments to a tower site by truck;
   forming the plurality of vertically stacked hybrid wind turbine tower support structure modules one module at a time by
      erecting the plurality of connected hybrid wind turbine tower support structure segments;
      connecting the plurality of connected hybrid wind turbine tower support structure segments together with the connection assemblies to form a complete circumference with the void formed between the inner fiber composite material wall and the outer fiber composite material wall;
      pouring concrete into the void formed between the inner fiber composite material wall and the outer fiber composite material wall at the tower site.

15. The method of claim 14, wherein forming the plurality of vertically stacked hybrid wind turbine tower support structure modules one module at a time includes forming a new hybrid wind turbine tower support structure module vertically on top of a previously formed hybrid wind turbine tower support structure module.

* * * * *

UNITED STATES PATENT AND TRADEMARK OFFICE
CERTIFICATE OF CORRECTION

| | | |
|---|---|---|
| PATENT NO. | : 9,062,662 B1 | Page 1 of 1 |
| APPLICATION NO. | : 14/226471 | |
| DATED | : June 23, 2015 | |
| INVENTOR(S) | : David W. Johnson et al. | |

It is certified that error appears in the above-identified patent and that said Letters Patent is hereby corrected as shown below:

IN THE SPECIFICATION

COL. 1 LINE 5

Insert before paragraph 1:

--This invention was made with government support under Contract Award No. DE-SC0001578 awarded by the Department of Energy. The government has certain rights in this invention.--

Signed and Sealed this
Twentieth Day of October, 2015

Michelle K. Lee
*Director of the United States Patent and Trademark Office*